(12) United States Patent
Yu et al.

(10) Patent No.: US 8,965,078 B2
(45) Date of Patent: Feb. 24, 2015

(54) PROJECTION-SPACE DENOISING WITH BILATERAL FILTERING IN COMPUTED TOMOGRAPHY

(75) Inventors: Lifeng Yu, Inver Grove Heights, MN (US); Armando Manduca, Rochester, MN (US); Joshua Trzasko, Rochester, MN (US); Joel G. Fletcher, Oronoco, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 647 days.

(21) Appl. No.: 13/145,461

(22) PCT Filed: Feb. 19, 2010

(86) PCT No.: PCT/US2010/024800
§ 371 (c)(1),
(2), (4) Date: Jul. 20, 2011

(87) PCT Pub. No.: WO2010/096701
PCT Pub. Date: Aug. 26, 2010

(65) Prior Publication Data
US 2011/0286651 A1   Nov. 24, 2011

Related U.S. Application Data

(60) Provisional application No. 61/154,130, filed on Feb. 20, 2009.

(51) Int. Cl.
*G06K 9/00* (2006.01)
*G06T 11/00* (2006.01)

(52) U.S. Cl.
CPC ..... *G06T 11/005* (2013.01); *G06T 2207/20028* (2013.01)
USPC .......................................................... 382/128

(58) Field of Classification Search
USPC .................................................. 382/128–134
See application file for complete search history.

(56) References Cited

U.S. PATENT DOCUMENTS

| | | | |
|---|---|---|---|
| 7,146,059 B1 | 12/2006 | Durand et al. | |
| 7,245,755 B1 * | 7/2007 | Pan et al. | 382/131 |
| 2003/0076988 A1 * | 4/2003 | Liang et al. | 382/131 |
| 2004/0167387 A1 * | 8/2004 | Wollenweber et al. | 600/407 |
| 2007/0031019 A1 | 2/2007 | Lesage et al. | |
| 2007/0036269 A1 * | 2/2007 | Lienard et al. | 378/98.12 |
| 2008/0101667 A1 * | 5/2008 | Begelman et al. | 382/128 |
| 2008/0118128 A1 | 5/2008 | Toth | |
| 2011/0286651 A1 * | 11/2011 | Yu et al. | 382/131 |
| 2012/0281897 A1 * | 11/2012 | Razifar et al. | 382/131 |

OTHER PUBLICATIONS

The International Search Report and Written Opinion as mailed on Apr. 20, 2010 for International Application No. PCT/US2010/024800.

(Continued)

*Primary Examiner* — Alex Liew
(74) *Attorney, Agent, or Firm* — Quarles & Brady, LLP (57) ABSTRACT

Projection data acquired with an x-ray CT system is filtered using a bilateral filter to reduce image noise and enable the acquisition at lower x-ray dose without the loss of image diagnostic quality. The bilateral filtering is performed before image reconstruction by producing a noise equivalent data set from the acquired projection data and then converting the bilateral filtered values back to a projection data set suitable for image reconstruction.

11 Claims, 5 Drawing Sheets

(56) References Cited

OTHER PUBLICATIONS

Vidholm, E., "Visualization and Haptics for Interactive Medical Image Analysis," Digital Comprehensive Summaries of Uppsala Dissertations from the Faculty Science and Technology 386 [online], Feb. 8, 2008 [retrieved on May 4, 2010], Retrieved from the Internet:<URL: http://uu.diva-portal.org/smash/get/diva2:171287/FULLTEXT01>.

* cited by examiner

PROJECTION-SPACE DENOISING WITH BILATERAL FILTERING IN COMPUTED TOMOGRAPHY

CROSS-REFERENCE TO RELATED APPLICATIONS

This application is based on U.S. Provisional Patent Application Ser. No. 61/154,130 filed on Feb. 20, 2009 and entitled "SYSTEM AND METHOD FOR PROJECTION-SPACE DENOISING WITH BILATERAL FILTERING IN COMPUTED TOMOGRAPHY"; and is a U.S. National Phase of PCT International Application No. PCT/US2010/024800, filed on Feb. 18, 2010, both applications are incorporated herein by reference.

BACKGROUND OF THE INVENTION

The present invention relates to computed tomography (CT) imaging systems, and more particularly, improved filtering techniques for enhancing detail and minimizing noise in images generated using CT or other imaging systems.

In a CT system, an x-ray source projects a fan-shaped beam which is collimated to lie within an X-Y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce the transmission profile at a particular view angle. Such measurements are often referred to as a "projection" or "projection view" and the data is said to be acquired in "Radon" space.

The source and detector array in a conventional CT system are rotated on a gantry within the imaging plane and around the object so that the angle at which the x-ray beam intersects the object constantly changes during a scan. The resulting set of acquired projection views is a "sinogram" data set that is processed to construct an image that corresponds to a slice taken through the object. The prevailing method for reconstructing an image from 2D data is referred to in the art as the filtered backprojection technique. This process converts the Radon space attenuation measurements in the sinogram into a "real" space image comprised of integers called "CT numbers" or "Hounsfield units", which are used to control the brightness of a corresponding pixel on a display.

As a result of the CT scanning process, the subject is exposed to a certain degree, or dose, of radiation. The potential cancer or other disease risks associated with the radiation exposure of CT scans has recently become the subject of increasing concerns. To minimize these risks, it is important to reduce the radiation dose level used in CT examinations. Unfortunately, any such reduction in the dose of radiation used in a CT scan leads to an increased level of noise in the measured projection data and the subsequent reconstructed images. Accordingly, in conventional systems, a substantial decrease in the amount of radiation used to perform a CT scan may result in a severe degradation in the diagnostic value of the CT examination.

Techniques for controlling noise in CT, may be employed on raw projection measurements, on log-transformed sinograms, during image reconstruction, or on images after reconstruction have been proposed as indicated below by references 1 through 7. In a conventional shift-invariant filtration method applied during the image reconstruction, the suppression of the high-frequency component in the sinogram is performed with a simple assumption that all the measurements are equally reliable, which may result in severe degradation of spatial resolution. More sophisticated methods have been developed to adaptively smooth the data by taking into account the local statistics in the measurements. Some of these methods are currently implemented on clinical scanners mainly to suppress the streaking artifacts caused by x-ray photon starvation. Many other approaches have also been proposed to incorporate more explicit statistical models and to iteratively restore the log-transformed data by optimizing a penalized weighted least-square or likelihood objective function. These iterative teachings are time consuming and have not been practical to implement in commercial CT systems.

Bilateral filtering is commonly used in photography applications to reduce noise. It is also employed in computer graphics applications to reduce noise in digital images. The bilateral filter is an improvement to the more common Gaussian filter that blurs images by averaging the pixel values in a region surrounding each image pixel to be filtered. Whereas the Gaussian filter weights the surrounding pixel values as a function of their distance from the central pixel to be filtered, the bilateral filter also weights the surrounding pixel values as a function of difference in magnitude of the central pixel and surrounding pixel. The result of this more complex weighting is that sharp edges in the image are preserved.

SUMMARY OF THE INVENTION

The present invention relates to computed tomography (CT) imaging systems, and more particularly, to an improved filtering of the acquired projection data set sinogram using a locally adaptive bilateral filter prior to image reconstruction. A CT noise model is incorporated into the filtering process, thus enabling the variations in the x-ray photons due to automatic exposure control (AEC) and the use of bowtie filters to be incorporated into the filtering process.

A general object of the invention is to enable the reduction of x-ray dose to the patient without reducing image diagnostic quality. In a preferred embodiment of the invention the x-ray dose was reduced 50% without sacrificing image quality in terms of noise-resolution properties.

Another object of the invention is to provide an effective CT image filter process that is practical to implement on commercial scanners.

DETAILED DESCRIPTION OF THE PREFERRED EMBODIMENT

Figure 1:
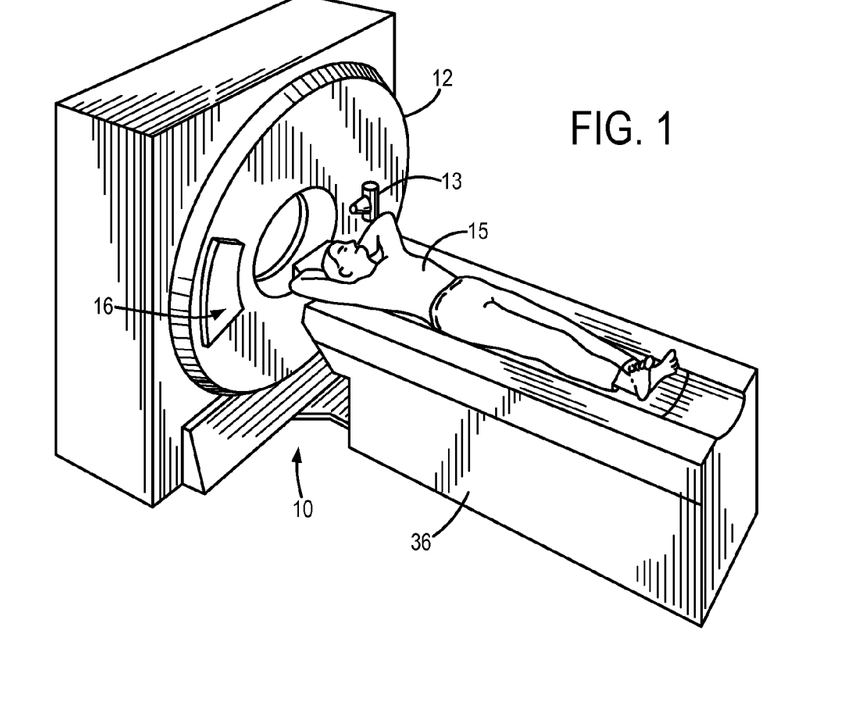
FIG. 1 illustrates a computed tomography (CT) imaging system including a gantry having an x-ray source and a plurality of detectors for sensing projected x-rays.
Figure 2:
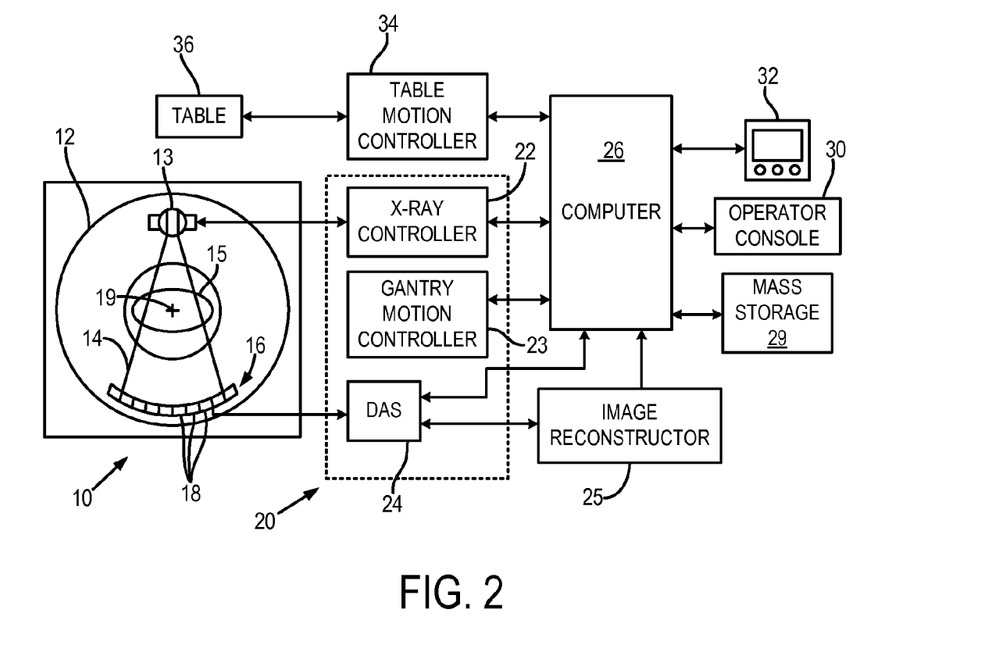
FIG. 2 illustrates a block diagram of the CT imaging system.

With initial reference to FIGS. 1 and 2, a computed tomography (CT) imaging system 10 includes a gantry 12 representative of a "third generation" CT scanner. Gantry 12 has an x-ray source 13 that projects a beam such as a fan or cone beam of x-rays 14 toward a detector array 16 on the opposite side of the gantry. The detector array 16 is formed by a number of detector elements 18 which together sense the projected x-rays that pass through a medical patient 15. Each detector element 18 produces an electrical signal that represents the intensity of an impinging x-ray beam and hence the attenuation of the beam as it passes through the patient. During a scan to acquire x-ray projection data, the gantry 12 and the components mounted thereon rotate about a center of rotation 19 located within the patient 15.

The rotation of the gantry and the operation of the x-ray source 13 are governed by a control mechanism 20 of the CT system. The control mechanism 20 includes an x-ray controller 22 that provides power and timing signals to the x-ray source 13 and a gantry motor controller 23 that controls the rotational speed and position of the gantry 12. A data acquisition system (DAS) 24 in the control mechanism 20 samples analog data from detector elements 18 and converts the data to digital signals for subsequent processing. An image reconstructor 25, receives sampled and digitized x-ray data from the DAS 24 and performs high speed image reconstruction by transforming the acquired Radon space sinogram to an image space data set. The reconstructed image is applied as an input to a computer 26 which stores the image in a mass storage device 29.

The computer 26 also receives commands and scanning parameters from an operator via console 30 that has a keyboard. An associated display 32 allows the operator to observe the reconstructed image and other data from the computer 26. The operator supplied commands and parameters are used by the computer 26 to provide control signals and information to the DAS 24, the x-ray controller 22 and the gantry motor controller 23. In addition, computer 26 operates a table motor controller 34 which controls a motorized table 36 to position the patient 15 in the gantry 12.

The present system provides a non-iterative approach for reducing noise in CT images using a locally-adaptive bilateral filter, which may incorporate a noise model and can be implemented in an efficient manner. The system may be implemented by image reconstructor 25 in the CT imaging system 10 or any other data manipulation computer connected to CT imaging system 10 for receiving and modifying the acquired projection data therefrom. The present system uses bilateral filtering, which smoothes a projection dataset using a weighted average of attenuation measurements within a local neighborhood to assign a value to a particular attenuation measurement. The various weights are determined according to both the spatial proximity of the values, as well as the intensity similarity between the center or target measurement and the neighboring measurements. The filtering technique is locally adaptive and can preserve important edge information in the sinogram data without significantly sacrificing the spatial resolution of the dataset. The system also implements optional compensation for the effects of bow-tie filtering of the x-ray beam and automatic exposure control as implemented by many CT systems.

In general, the noise found in CT images has two primary sources: quantum noise and electronic noise. Electronic noise in the CT projection data generally results from electronic fluctuations in the detector photodiode and other electronic components of the system. Quantum noise is due to limitations in the device's detectors causing only a limited number of photons to be detected or collected. Generally, the detectors 18 of a CT imaging system operate using an energy integration method wherein the detector generates an output signal that is proportional to the amount of photon energy collected by the detector over a period time. Even though the detectors 18 tend to use an integration model it is useful in modeling noise characteristics to use a photon-counting model to characterize each of the detectors in the place of an integration model. In the photon-counting model, rather than integrate total collected energy over time, each detector 18 is assumed to count a number of detected photons. In that model, the output value of the detector 18 is therefore proportional to the total number of received and counted photons.

During the CT scan process, the x-rays pass through a plurality of attenuating paths throughout the imaged subject. Along each attenuating path, there are a number of photons incident to the subject, and a number of photons that penetrate through the subject and are detected. In the present model, for a given attenuating path in the imaged subject, the incident and the penetrated photon numbers are denoted as $N_0(\alpha,v,\lambda)$ and $N(\alpha,v,\lambda)$, respectively, where $\alpha$ and $v$ denote the index of detector bins along radial and longitudinal directions, and $\lambda$ denotes the index of projection angle. In this case, with the presence of noise, the measured data is considered a stochastic process. Accordingly, the line integral along an attenuating path may be given by $$P = -\ln(N/N_0) \qquad \text{Equation (1)}$$

In the present example, $N_0$ is a deterministic constant and $N$ is Poisson-distributed with a mean of $N_m$. Also, the effects of electronic noise are not considered and the model presumes that the data collected on each detector bin and hence each attenuation measurement in a projection view are uncorrelated.

Referring particularly to FIG. 2, the present invention may be implemented by receiving the CT raw data comprised of a set of projection views (P) from DAS 24 and performing the filtering process now to be described. This filtering process may be carried out by the image reconstructor 25 or a separate processor, but it is important to note that it is performed on projection data (P) before the usual image reconstruction process begins.

Figure 3:
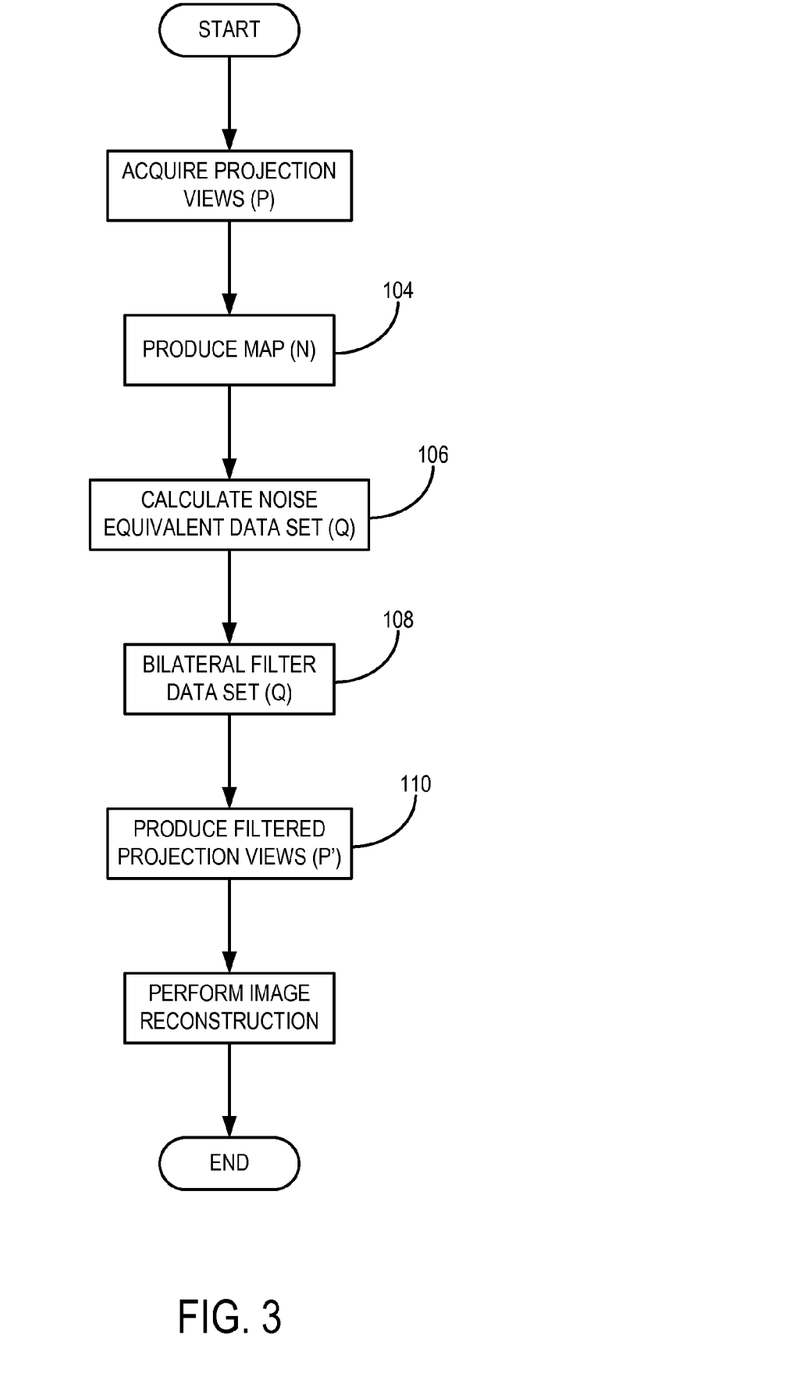
FIG. 3 is a flow chart of a preferred method for implementing a locally-adaptive bilateral filter on the data acquired by the system of FIGS. 1 and 2.

Referring particularly to FIG. 3, the first step in the filtering process is to convert the projection data (P) to a map indicating the noise-equivalent number of detected x-ray photons at each attenuation measurement locations as indicated at process block 104. To incorporate the described noise model into the projection data for bilateral filtering, the measured sinogram projection data P is first converted into a dataset representing a map of the detected number of photons. Accordingly, in view of equation (1), the map values may be expressed as:

$$N = N_0 \exp(-P) \qquad \text{Equation (2)}$$

In most cases, the x-ray photons that are emitted by CT imaging device 10 are polychromatic. Accordingly, the total number of incident photons before attenuation ($N_0$) is an approximation of the noise-equivalent photon number.

The noise-equivalent photon number is considered to approximate a Poisson-distributed dataset. The Anscombe transform is a well-known statistical tool to convert such a Poisson-distributed dataset to a normally-distributed dataset with constant variance. It can be applied here, but in view of at the large photon numbers typically encountered in CT, it is approximated by a square root transform in this preferred embodiment. Thus, in this embodiment, a square root of the dataset ($N_0$) containing the map of noise-equivalent photon numbers is performed next as indicated at process block 106 to generate a normally-distributed dataset (Q). The normally-distributed dataset may then be used for denoising. The square-root-transformed data (Q) is thus given by:

$$Q = = \sqrt{N} = \sqrt{N_0 \exp(-P)}. \quad \text{Equation (3)}$$

After generating the normally-distributed dataset Q, bilateral filtering may be applied to remove noise from the dataset as indicated at process block 108 and as will be described in more detail below with respect to FIG. 4. After filtering, the dataset Q is converted back to a log-transformed sinogram P as indicated at process block 110. This conversion step is simply the inversion of equation (3). That is, calculating the square values of the values in the filtered data set (Q) and dividing the results by $N_0$. The filtered sinogram data set (P') is then produced by taking the logarithm of the result. After the re-conversion, the filtered sinogram is used for conventional image reconstruction which is performed by the image reconstructor 25 as described above.

Figure 4:
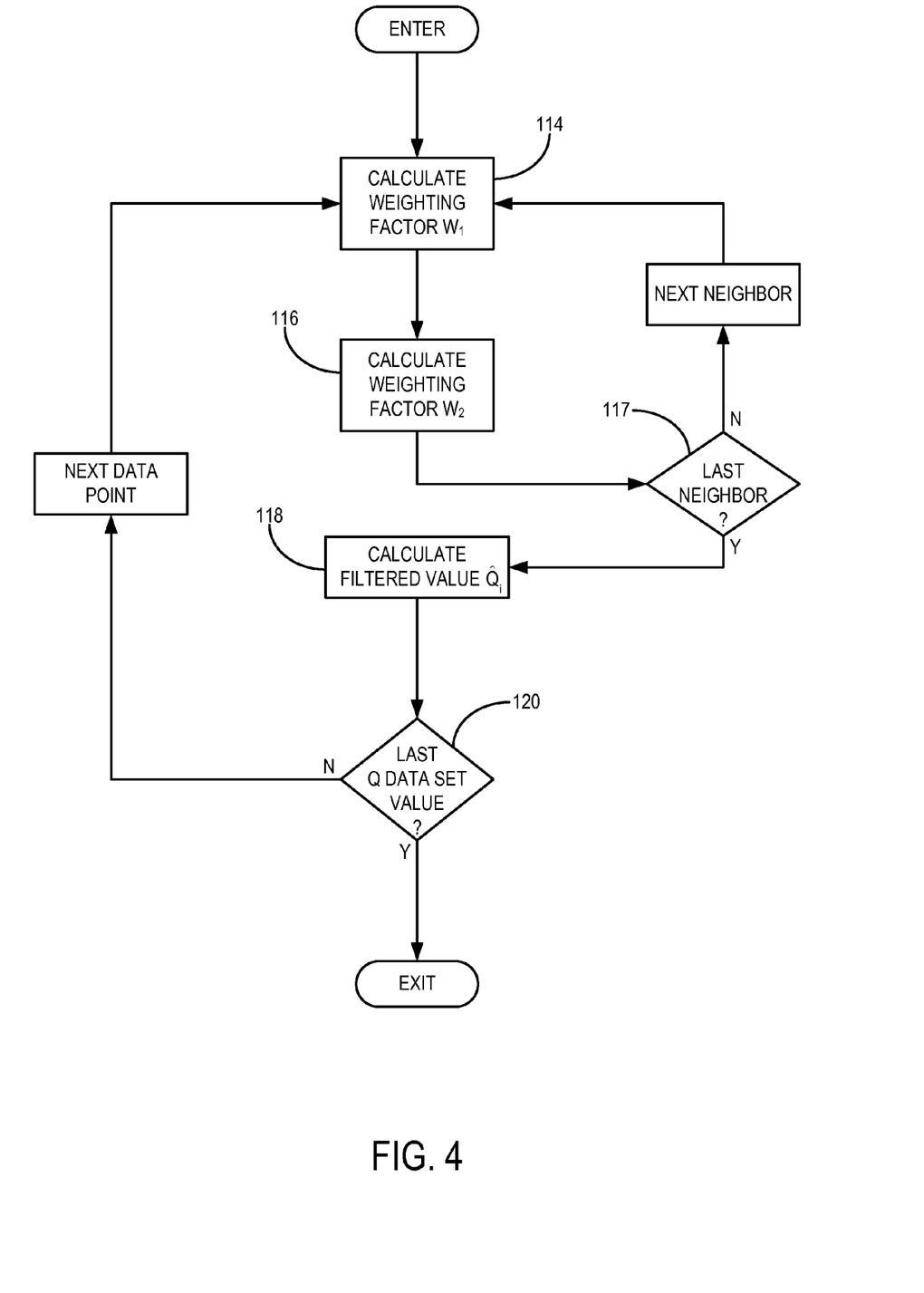
FIG. 4 is a flow chart of the steps performed by the bilateral filter step in FIG. 3.

Referring particularly to FIGS. 3 and 4, the bilateral filtering step 108 provides a non-iterative and locally adaptive method for removing additive noise while preserving edge information. As described above, the bilateral filtering step is applied to converted sinogram projection data before an image is reconstructed by image reconstructor 25. The bilateral filter input, Q when practicing this present invention is the normally-distributed dataset described above and formed in step 106. It includes a stationary Gaussian process with a mean of Q:

$$Q_s = Q_m + x \quad \text{Equation (4)}$$

In Equation (4), x is white Gaussian noise present in the original image Q. $Q_s$ represents a dataset embodying a stochastic process, while $Q_m$ is used to denote the mean of that dataset.

To restore the original image dataset $Q_m$ from the noise-contaminated image $Q_s$, a bilateral filter is applied. The bilateral filter calculates a weighted average of Q data set values in a region surrounding any given data set value $Q_i$, which is given by:

$$\hat{Q}_i = \frac{\sum_{j \in \Omega_i} W_1(i,j) W_2(i,j) Q_j}{\sum_{j \in \Omega_i} W_1(i,j) W_2(i,j)} \quad \text{Equation (5)}$$

The weighted average is determined for each value $Q_i$ in the noise-contaminated data set Q. In equation (5), j is the index of a neighborhood Q data set value inside a region $\Omega_i$ centered on Q data set value $Q_i$, and the weights $W_1$ and $W_2$ are given by:

$$W_1(i,j) = \exp\left(-\frac{(i-j)^2}{2w^2}\right) \quad \text{Equation (6)}$$

$$W_2(i,j) = \exp\left(-\frac{(Q_i - Q_j)^2}{2\sigma^2}\right) \quad \text{Equation (7)}$$

In equations (6) and (7), the first weighting factor $W_1$ calculates a weight according to the distance between the center Q data set and a neighboring value, while the second weighting factor, $W_2$, calculates the weight according to the magnitude difference between the center value $Q_i$ and a neighboring value $Q_j$. Parameters w and $\sigma$ can be used for controlling the spatial and intensity range of the weighting.

In step 108, equations 4-7 are applied to the noise-contaminated dataset Q to obtain a denoised dataset by applying the filtering factor of equation (5) to each data point in dataset Q. More specifically, for each location j in the region surrounding a data point $Q_i$ in data set Q the weighting factor $W_1$ is calculated as indicated at process block 114 and in equation (6). As indicated at process block 116, the weighting factor $W_2$ is then calculated according to equation (7). The weighting values $W_1$ and $W_2$ are calculated for each location j in the region surrounding location i and when all values have been calculated as indicated at decision block 117, the filtered Q data set value $\hat{Q}_i$ is calculated according to equation (5) as indicated at process block 118. The process is repeated for each Q data set value until all of its values have been filtered as indicated at decision block 120.

This noise model and denoising process generally requires an estimate of the incident number of photons ($N_0$) on the patient or scanned object. The number of incident photons may be difficult to determine, because in many CT imaging systems the number of incident photons $N_0$ not only varies for each projection angle due to the use of an automatic exposure control (AEC), but is also non-uniform across the x-ray fan beam. In many cases, non-uniform radiation across the radiation field is due to the implementation of beam-shaping bowtie filters that control the distribution and intensity of the x-ray beam across a subject. In order to accurately quantify the noise properties in the projection data and preserve the noise pattern in the denoised image, therefore, these effects should be taken into consideration. In one implementation, the incident number of photons ($N_0$) is expressed as a function of detector bin index $\alpha$ and v based upon an estimation of the $N_0$ non-uniformity across the width of the x-ray fan beam, and as a function of projection angle $\lambda$ based upon the x-ray tube current modulation that results from AEC implementation.

Figure 5:
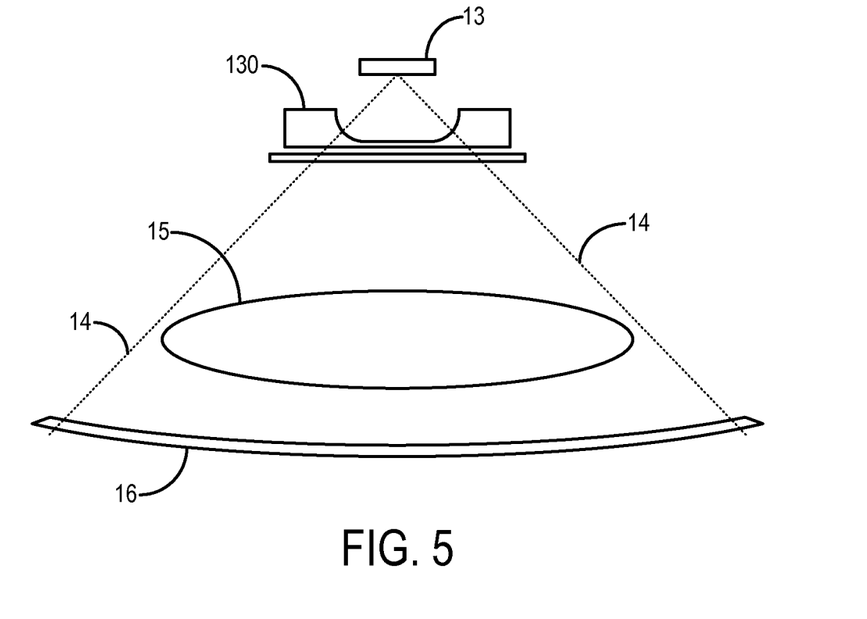
FIG. 5 illustrates the operation of a bowtie filter to reduce the incident x-ray intensity within a peripheral region of the x-ray fan-beam.

More specifically, a bowtie filter 130 may be used in CT system 10 to modify the output characteristics of the x-ray beam 14 as shown in FIG. 5. Because the cross section of most patients is oval or circular shaped, the x-ray attenuation in the peripheral region of the bowtie filter 130 is greater than that in the central region, where the strength of the x-ray beam is at its greatest. The purpose of the bowtie filter 130, therefore, is to reduce the incident x-ray intensity in the peripheral region so that the radiation dose to the patient, especially the skin dose, can be minimized. As a consequence, the x-ray intensity $N_0$ incident to the patient is highly non-uniform across the fan-beam, and this non-uniformity affects the noise properties in the acquired CT data.

Figure 6:
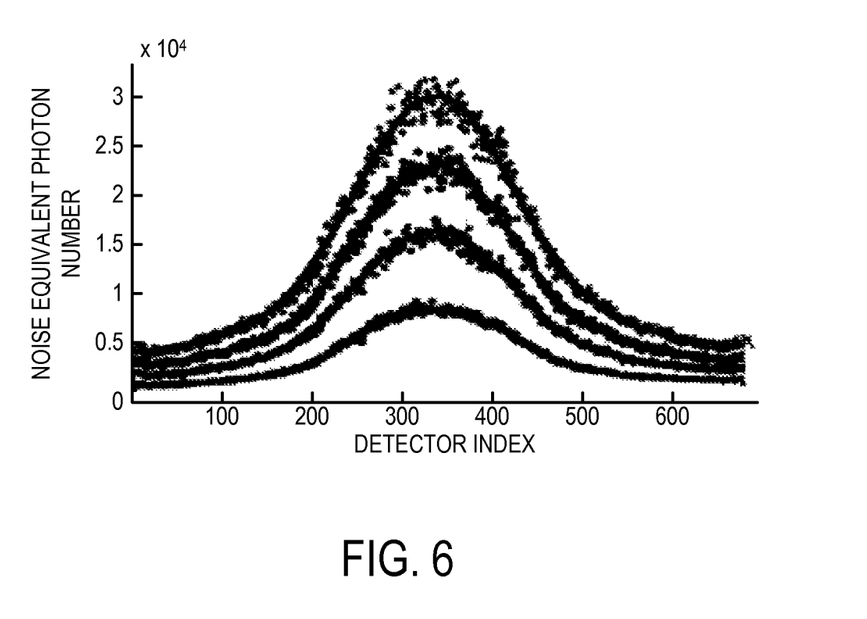
FIG. 6 illustrates noise-equivalent number of x-ray photon curves for different energy levels generated by a CT device.

The effect of the bowtie filter can be determined by measuring the variance of the x-ray transmission during an air scan. The inverse of the air scan variance is a photon number which can be used to estimate the incident x-ray intensity across the x-ray beam. FIG. 6 displays an example of the noise-equivalent photon number on a single detector row across the x-ray fan beam obtained for different x-ray tube potentials (kV). Four calibration curves of the incident x-ray intensity for the four kVs (80, 100, 120, 140) that are usually used on the CT scanners are formed by fitting the variance with a third- or fourth-order Gaussian equation. Depending upon the system, the calibration curves may be dependent upon the configuration of the detector collimation. Having determined the effect of the bow-tie filter on the distribution of x-ray energy across a subject, the effect can be integrated into the noise model described above, by expressing $N_0$ as a function of tube current and detector index.

Figure 7:
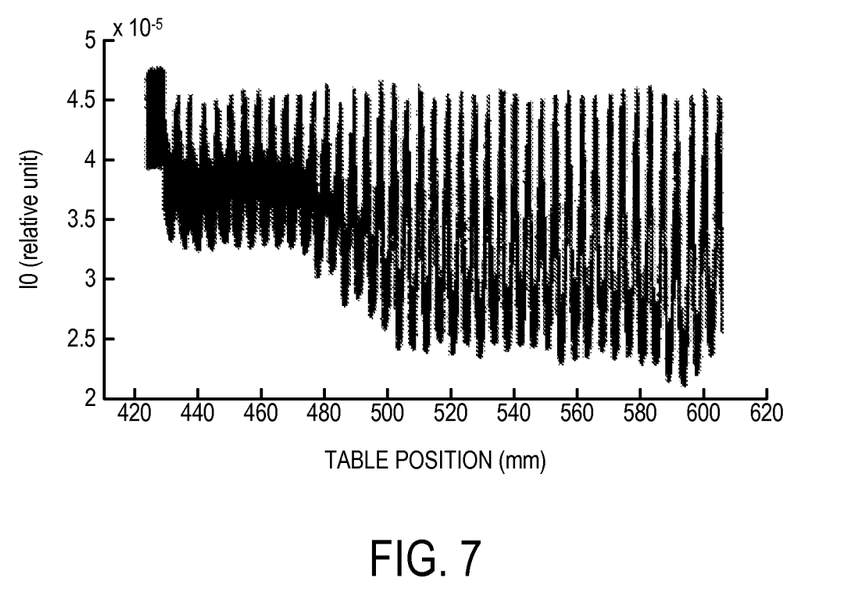
FIG. 7 illustrates reference signals generated by the system of FIGS. 1 and 2 for use with automatic exposure control (AEC).

The other factor that affects the accuracy of the noise model and the denoising process is a variance in x-ray beam strength resulting from AEC. In abdominal CT scans, for example, AEC is often used in an attempt to minimize the amount of radiation dosage to which the patient or subject is exposed. FIG. 7 shows an example of tube current modulation generated by a CT scanner using AEC. The curve shows the reference signals of the tube as a function of table position, which corresponds to a certain x-ray tube angle. The reference signal is proportional to the tube current used for that table position and projection angle. As illustrated, the tube current oscillates during the gantry rotation in order to adapt to the attenuation level of the patient along different orientations. This automatic tube current modulation leads to a continuous change of the incident x-ray intensity $N_0$, which will also affect the noise characteristics of the CT data. In the present system, the effect of AEC may be compensated for by extracting the reference signal from each projection frame and then estimating the corresponding reference x-ray intensity. In one example, the calibration curves determined from the bowtie filter (for example, as shown in FIG. 6) are used for this estimation. Accordingly, the AEC variance in x-ray intensity may be incorporated into the noise model described above by scaling the noise equivalent photon numbers obtained in the calibration curves for the bowtie filter. The scaling factor is simply the ratio of the reference signal in the patient scan and that in the calibration scan.

In one example study implementing the present system, the noise-resolution properties of bilateral filtering, as described above, were evaluated using a dual-source CT scanner. A phantom subject was used for the study. The phantom subject included a small acrylic cylinder and a thin wire of the type that is typically used for quality control on popular CT imaging devices. The subject was scanned using the following parameters: 120 kVp, 0.5 second rotation time, 32×0.6 mm detector collimation, helical pitch 1.0. Two series were obtained with mAs being 40 and 80, respectively. The images were reconstructed using a series of kernels available on the scanner with a slice thickness of 1 mm and an field of vision (FOV) size of 50 mm. The raw data from the 40 mAs scan were downloaded from the scanner and denoised with bilateral filtering as described above. In one case, the denoising parameters were w=5 and σ=1, 1.5, 2, 2.5, 3, 4. The denoised data were uploaded to the scanner and reconstructed with B70f and B40f kernels, respectively. The modulation transfer function (MTF) on each image, either directly reconstructed on the scanner or after bilateral filter denoising, was calculated.

Examination of the two-resulting images reveals that the noise-resolution trade-offs are similar for bilateral filtering with 40 mA data acquisition and the conventional body kernel filtering with 80 mA data acquisition. At higher spatial resolution, however, the bilateral filtering provides improved results. These results demonstrate that the use of bilateral filtering to denoise CT scan data can achieve similar or even improved image quality over the filter kernels available on a conventional scanner with double the radiation dose. In other words, the radiation dose can be reduced to approximately 50% using bilateral filtering without sacrificing the image quality in terms of noise-resolution properties.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for filtering a sinogram data set (P) comprised of projection views acquired by a tomographic system, the steps of the method comprising:
   a) converting the sinogram data set into a map (N) having values that indicate a noise-equivalent number of detected photons, wherein the values in the map are a function of incident photons ($N_0$) and values in the sinogram data set;
   b) calculating a normally distributed photon count data set (Q) from the values in the map (N) produced in step a);
   c) filtering values in the normally distributed photon count data set (Q) using a bilateral filter; and
   d) converting the values in the normally distributed photon count set (Q) filtered in step c) to produce a filtered sinogram data set (P') suitable for producing an image using an image reconstruction process.

2. The method as recited in claim 1 in which step d) includes:
   performing an inverse of the calculation performed in step b) on the values in the normally distributed photon count data set (Q) filtered in step c).

3. A method for filtering a sinogram data set (P) comprised of projection views acquired by a tomographic system, the steps of the method comprising:
   a) producing, using the sinogram data set, a map (N) indicating a noise-equivalent number of detected photons, the map having values that are a function of incident photons ($N_0$) and values in the sinogram data set;
   b) calculating a normally distributed data set (Q) from the values in the map (N) produced in step a);
   c) filtering values in the normally distributed data set (Q) using a bilateral filter;
   d) converting the values in the data set (Q) filtered in step c) to produce a filtered sinogram data set (P') suitable for producing an image using an image reconstruction process; and
   in which step c) includes:
   c)i) calculating a first weighting factor ($W_1$) for each value in a region surrounding a central value to be filtered, which is a function of distance between a central value and a surrounding value;
   c)ii) calculating a second weighting factor ($W_2$) for each value in a region surrounding a central value to be filtered, which is a function of the magnitude difference between the central value and the surrounding value; and
   c)iii) calculating the filtered values using the first and second weighting factors.

4. The method as recited in claim 3 in which the first weighting factor ($W_1$) is calculated as:

$$W_1(i, j) = \exp\left(\frac{(i-j)^2}{2S^2}\right)$$

wherein:
   i=location of central value to be filtered;
   j=location of a surrounding value; and
   w=a selectable denoising parameter.

5. The method as recited in claim 3 in which the second weighting factor ($W_2$) is calculated:

$$W_2(i,j) = \exp\left(-\frac{(Q_i - Q_j)^2}{2\sigma^2}\right)$$

wherein:
  i=location of central value to be filtered;
  j=location of a surrounding value;
  $Q_i$=magnitude of central value to be filtered;
  $Q_j$=magnitude of surrounding value; and
  σ=a selectable denoising parameter.

6. The method as recited in claim 3 in which the filtered values are calculated as:

$$\hat{Q}_i = \frac{\sum_{j \in \Omega_i} W_1(i,j) W_2(i,j) Q_j}{\sum_{j \in \Omega_i} W_1(i,j) W_2(i,j)}$$

wherein:
  $W_1$=first weighting values for each surrounding value;
  $W_2$=second weighting values for each surrounding value;
  $\Omega_i$=locations in the surrounding region; and
  $\Omega_j$=magnitude of surrounding values.

7. The method as recited in claim 1 in which the incident photons ($N_O$) include variations such that the incident photons ($N_O$) vary in a known manner as a function of a location of each value in the sinogram data set.

8. The method as recited in claim 7 in which the variations in incident photons ($N_O$) reflect a use of a bowtie filter when acquiring the sinogram data set (P).

9. The method as recited in claim 7 in which the variations in incident photons ($N_O$) reflects a use of automatic exposure control (AEC) when acquiring the sinogram data set (P).

10. The method as recited in claim 1 in which step b) includes:
  calculating a square root of values in the map (N); and
  step d) includes:
    d)i) squaring values in the filtered data set (Q);
    d)ii) dividing the squared values calculated in step d)i) by $N_O$; and
    d)iii) taking a logarithm of the divided values calculated in step d)ii).

11. The method as recited in claim 1 in which step b) includes performing an Anscombe transform on the values in the map (N).

* * * * *

UNITED STATES PATENT AND TRADEMARK OFFICE
CERTIFICATE OF CORRECTION

PATENT NO. : 8,965,078 B2  
APPLICATION NO. : 13/145461  
DATED : February 24, 2015  
INVENTOR(S) : Lifeng Yu et al.

Page 1 of 1

It is certified that error appears in the above-identified patent and that said Letters Patent is hereby corrected as shown below:

In the Claims

Column 8, Claim 1, line 19, "count set" should be --count data set--.

Signed and Sealed this  
Second Day of June, 2015

Michelle K. Lee  
*Director of the United States Patent and Trademark Office*